Patented May 20, 1952

2,597,016

UNITED STATES PATENT OFFICE 2,597,016

PREPARATION OF TRICHLOROVINYLPENTA-CHLOROCYCLOPENTADIENE

Earl T. McBee and Jack S. Newcomer, West Lafayette, Ind., assignors to Purdue Research Foundation, La Fayette, Ind., a corporation of Indiana No Drawing. Application June 28, 1947, Serial No. 757,947

4 Claims. (Cl. 260—648)

The present invention relates to a novel process for the preparation of trichlorovinyltrichlorocyclopentadienone. The invention is more particularly concerned with a process for the preparation of trichlorovinyltrichlorocyclopentadienone from hexachlorocyclopentadiene which proceeds through the intermediates (a) 5-(1,2,2,2-tetrachloroethyl)-pentachloro-1,3-cyclopentadiene, (b) trichlorovinylpentachlorocyclopentadiene, and (c) a trichlorovinyltrichlorocyclopentadienone acetal.

It is an object of the present invention to provide a novel synthesis of trichlorovinyltrichlorocyclopentadienone from hexachlorocyclopentadiene. Another object of the invention is the provision of a method for the preparation of trichlorovinyltrichlorocyclopentadienone from hexachlorocyclopentadiene, which proceeds through the intermediates (a) 5-(1,2,2,2-tetrachloroethyl)-pentachloro-1,3-cyclopentadiene, (b) trichlorovinylpentachlorocyclopentadiene, and (c) an acetal of trichlorovinyltrichlorocyclopentadienone. A further object of the invention is to provide trichlorovinyltrichlorocyclopentadienone and novel intermediates in the preparation thereof, namely, trichlorovinylpentachlorocyclopentadiene and trichlorovinyltrichlorocyclopentadienone acetals. An additional object of the invention is to provide a process for the preparation of trichlorovinyltrichlorocyclopentadienone from hexachlorocyclopentadiene, by (a) condensation of trichloroethylene with hexachlorocyclopentadiene to produce 5-(1,2,2,2-tetrachloroethyl)-pentachloro-1,3-cyclopentadiene, or to produce trichlorovinyltrichlorocyclopentadiene directly, (b) dehydrochlorination and rearrangement of the 5-(1,2,2,2-tetrachloroethyl)-pentachloro-1,3-cyclopentadiene to trichlorovinyltrichlorocyclopentadiene, (c) acetalization of the trichlorovinylpentachlorocyclopentadiene to produce an acetal of trichlorovinyltrichlorocyclopentadienone, (d) hydrolysis of the trichlorovinyltrichlorocyclopentadienone acetal to trichlorovinyltrichlorocyclopentadienone itself. Many other objects of the invention will become apparent hereinafter.

The ultimate product of the present invention, trichlorovinyltrichlorocyclopentadienone, is useful as a chemical intermediate in the preparation of more complex organic molecules, such as its diketone derivative or its dimer, and as a reactant with dienophiles to produce adducts.

The process of the present invention essentially comprises four steps. First, 5-(1,2,2,2-tetrachloroethyl)-pentachloro-1,3-cyclopentadiene is prepared by the condensation of hexachlorocyclopentadiene with trichloroethylene in the presence of aluminum chloride and then dehydrochlorinated and rearranged with the aid of aluminum chloride to produce trichlorovinylpentachlorocyclopentadiene. The first two steps may be combined, and the desired trichlorovinylpentachlorocyclopentadiene produced directly from hexachlorocyclopentadiene by altering the reaction conditions which give the 5-(1,2,2,2-tetrachloroethyl)-pentachloro-1,3-cyclopentadiene, as shown in the example hereinafter. Trichlorovinylpentachlorocyclopentadiene is then acetalized to produce an acetal of trichlorovinyltrichlorocyclopentadienone, which is then hydrolyzed to give trichlorovinyltrichlorocyclopentadienone itself.

Step 1.—Condensation of hexachlorocyclopentadiene with trichloroethylene.

The condensation of hexachlorocyclopentadiene with trichloroethylene may be accomplished in the presence of aluminum chloride. The temperature range for the reaction is usually between about 60 and 140 degrees centigrade, with the optimum temperature range being between 70 and 85 degrees centigrade. At 60 degrees centigrade, the reaction is quite slow; at 90–100 degrees centigrade, the reaction produces some dimer of hexachlorocyclopentadiene; and, at 120 degrees centigrade, some dehydrochlorination of the product may also be noticed.

The starting materials in the condensation may be reacted together in any suitable manner. However, the reactants are usually heated together, and trichloroethylene is ordinarily added to the hexachlorocyclopentadiene in order to minimize formation of higher molecular weight condensation products and to allow a more ready control of the highly exothermic reaction. The application of heat to an equimolar mixture of reactants in the presence of a catalytic quantity of aluminum chloride should be regulated carefully as the reaction may become very vigorous at temperatures above about 85 degrees centigrade, and may rise rapidly from about 85 to 130 degrees centigrade with the formation of the desired product, 5-(1,2,2,2-tetrachloroethyl)-pentachloro-1,3-cyclopentadiene, dehydrochlorination derivatives of this product, such as trichlorovinylpentachlorocyclopentadiene, condensation products of the chlorinated olefin with either of the foregoing products, and the dimer of hexachlorocyclopentadiene. Such side-reactions, of course, considerably reduce the yield of 5-(1,2,2,2-tetrachloroethyl)-pentachloro-1,3-cyclopentadiene, and are usually avoided by addition of the olefin to the hexachlorocyclopentadiene in a manner such that a sizeable concentration of the olefin is never present, or, if it is desired to react the starting materials in higher concentrations of the olefin, by maintaining the temperature below about 85 degrees centigrade and carefully regulating the same. However, when the trichloroethylene is added portionwise to the hexachlorocyclopentadiene, the temperature employed may be anywhere in the range between 60 and 140 degrees centigrade, depending upon the rate of addition, with temperatures between 70 and 85 degrees centigrade being preferable also when operating in this manner. The yield of 5-(1,2,2,2-tetrachloroethyl)-pentachloro-1,3-cyclopentadiene obtainable from a reaction of trichloroethylene and hexachlorocyclopentadiene within the preferred temperature range is as high as 90 per cent, with the formation of inappreciable quantities of byproducts.

The reactants are employed preferably in a one to one molar ratio of trichloroethylene to hexachlorocyclopentadiene, although ratios higher or lower are also operative. However, lower ratios do not allow optimum yields of the monocondensation product, and materially higher ratios are usually productive of further condensation of trichloroethylene with the products. Thus, with ratios of trichloroethylene to hexachlorocyclopentadiene much in excess of 1:1, condensation of trichloroethylene with 5-(1,2,2,2-tetrachloroethyl)-pentachloro-1,3-cyclopentadiene or the dehydrochlorination product thereof may occur.

*Step 2.*—Dehydrochlorination and rearrangement of 5-(1,2,2,2-tetrachloroethyl)-pentachloro-1,3-cyclopentadiene to trichlorovinylpentachlorocyclopentadiene.

The product of the first step in the process, 5-(1,2,2,2-tetrachloroethyl)-pentachloro-1,3-cyclopentadiene, may be separated from the reaction product and thereafter heated in admixture with a catalytic quantity of aluminum chloride at a temperature between about 90 and 180 degrees centigrade, preferably between about 110 and 130 degrees centigrade, in order to effect a rearrangement and dehydrochlorination to trichlorovinylpentachlorocyclopentadiene.

The above procedure for the production of trichlorovinylpentachlorocyclopentadiene is entirely satisfactory, but a somewhat more advantageous mode of operation resides in a continued heating of the reaction mixture of trichloroethylene and hexachlorocyclopentadiene, after the conversion of substantial quantities of hexachlorocyclopentadiene to tetrachloroethylpentachlorocyclopentadiene, at a higher temperature. The condensation procedure may advantageously be conducted as indicated above under Step 1, and, when addition of trichloroethylene is substantially complete, the temperature may advantageously be increased to or maintained at between about 90 and 180 degrees centigrade, preferably between 100 and 130 degrees centigrade, to effect the desired rearrangement and dehydrochlorination. This is possible inasmuch as the condensation usually demands a relatively short period of time, due to its relatively high reaction rate, while the dehydrochlorination and rearrangement reaction is considerably slower, and does not occur to any material extent until substantial completion of the condensation reaction. The preparation of trichlorovinylpentachlorocyclopentadiene may thus be conducted from hexachlorocyclopentadiene, with or without the intermediate separation of 5-(1,2,2,2-tetrachloroethyl)-pentachloro-1,3-cyclopentadiene. Excellent yields, up to about 70 per cent, of the desired trichlorovinylpentachlorocyclopentadiene are obtained according to either manner of operation, and the procedure omitting separation of the intermediate 5-(1,2,2,2-tetrachloroethyl)-pentachloro-1,3-cyclopentadiene is preferred only as it allows preparation of the desired product from hexachlorocyclopentadiene in a single operation rather than in two separate steps.

*Step 3.*—Preparation of acetals of trichlorovinyltrichlorocyclopentadienone.

Acetals of trichlorovinyltrichlorocyclopentadienone are prepared by the reaction of a selected alcohol with trichlorovinylpentachlorocyclopentadiene. The reaction is conducted either with an alcohol or an alkali-metal alcoholate. In any method of operation, it is always desirable to conduct the reaction under alkaline conditions. Representative alcohols which may be reacted with trichlorovinylpentachlorocyclopentadiene to produce acetals of trichlorovinyltrichlorocyclopentadienone are methanol, ethanol, propanol, butanol, cyclohexanol, benzyl alcohol, and the like. Alkali-metal alcoholates, such as sodium or potassium methoxide, ethoxide, propoxide, benzoxide, cyclohexoxide, etc., are also operative for the production of the respective acetals of trichlorovinyltrichlorocyclopentadienone. Still other compounds which may be reacted with the trichlorovinylpentachlorocyclopentadiene to produce an acetal are ethylene glycol, glycerine, mannitol, sorbitol, pentaerythritol, erythritol, cellulose, sodium cellulose, allyl alcohol, sodium naphthoxide, and the like.

The temperature for the acetalization is usually between about 0 and 150 degree centigrade, preferably between about 30 and 100 degrees centigrade, and ordinarily at or below the reflux temperature of the alcohol employed. In instances where an alkali-metal alcoholate is employed, lower temperatures are usually satisfactory. In some cases, it may be desirable to employ an anhydrous medium, such as anhydrous ethanol, and to conduct the reaction with the more reactive potassium alcoholate, or in an inert media such as dioxane or trioxane. However, the acetalization may be conducted without difficulty by employing an alcoholic base, and extraordinary conditions are generally not required.

The proportions of the reactants are not critical, but an excess of the alcohol or alcoholate is usually employed in order to obtain optimum yields of desired acetal. When an alcohol is employed, the amount of alkali may vary from the theoretical to about three times the amount required, without any material effect upon results. In general, the alcoholic base or alcoholate is added to the trichlorovinylpentachlorocyclopentadiene, but the reverse mode of addition is also satisfactory. Acetals of di(trichlorovinyl)-dichlorocyclopentadienone may be prepared similarly starting with di(trichlorovinyl) tetrachlorocylopentadiene. The acetalization of trichlorovinylpentachlorocyclopentadiene type compounds is more broadly disclosed in our copending application Serial 757,946, now abandoned, and may be ascertained by reference thereto.

*Step 4.*—Preparation of trichlorovinyltrichlorocyclopentadienone.

The preparation of trichlorovinyltrichlorocyclopentadienone from an acetal thereof may be accomplished at a temperature below about 35 degrees centigrade, preferably below about 10 degrees centigrade, by the action of an inorganic acid, e. g., concentrated sulfuric acid, hydrochloric acid, fluorosulfonic acid, chlorosulfonic acid, etc., thereon. The reactants are admixed at or below the desired temperature in any suitable manner, the acetal usually being added to the stirred acid, and the temperature then regulated to maintain the desired level, but any other mode of addition or admixture being satisfactory. At a temperature of 30 to 45 degrees centigrade, the main product is a yellow diketone, having the formula, $C_7Cl_5O_2H$, and a melting point of 96 degrees centigrade, which is produced by the hydrolytic action of sulfuric acid on the first product of the reaction, trichlorovinyltrichlorocyclopentadienone. At about 0 to 5 degrees centigrade, the product consists essentially of a mixture of trichlorovinyltrichlorocyclopentadienone and its dimer, with no appreciable diketone being formed.

The diketone, $C_7Cl_5O_2H$, is more readily formed by the action of concentrated sulfuric acid on trichlorovinylpentachlorocyclopentadiene at a temperature of about 100-150 degrees centigrade, preferably 120 to 125 degrees centigrade, for a period of about 4 hours, under which conditions a forty per cent yield of the diketone is obtained.

Trichlorovinyltrichlorocyclopentadienone reacts with itself to produce a white crystalline dimer, having a melting point of 207 degrees centigrade, which evolves carbon monoxide at temperatures above about 240 degrees centigrade, and also reacts with dienophilic olefinic compounds such as ethyl maleate, p-benzoquinone, maleic anhydride, and acrylonitrile, to yield 1,4-adducts. The dimer may, for example, be obtained by the addition of alcohol to the red liquid solution of monomeric trichlorovinyltrichlorocyclopentadienone and the dimer thereof, which solution results from the sulfuric acid hydrolysis of the acetal, while the adducts result from reaction with the particular dienophile at a temperature below about 200 degrees centigrade. When operating under optimum temperature conditions, e. g., zero to 10 degrees centigrade, some of the monomeric trichlorovinyltrichlorocyclopentadienone, a red oil, is converted to the dimer. An additional amount of the dimer may be obtained by separating the trichlorovinyltrichlorocyclopentadienone from the hydrolysis reaction product, and thereafter heating at an elevated temperature within the prescribed range to produce the dimer of trichlorovinyltrichlorocyclopentadienone.

The concentrated sulfuric acid employed for the hydrolysis of a trichlorovinyltrichlorocyclopentadienone acetal to trichlorovinyltrichlorocyclopentadienone is ordinarily above about 50 per cent concentration. The concentration of the acid is preferably above about 80 per cent. However, any concentration of acid which will be productive of the desired result may be employed, with the time required for the reaction with an acid of less than 50 per cent, of course, being correspondingly longer, due to decreased solubility of the organic materials therein, than with an acid of higher concentration.

Other compounds which may be converted to acetals and then, by acid hydrolysis, to ketones are di(trichlorovinyl)tetrachlorocyclopentadiene, tri(trichlorovinyl)trichlorocyclopentadiene, and tetra(trichlorovinyl)dichlorocyclopentadiene, which may be prepared by the reaction of trichloroethylene with trichlorovinylpentachlorocyclopentadiene according to the directions given for the production of trichlorovinylpentachlorocyclopentadiene by the condensation of trichloroethylene with hexachlorocyclopentadiene, and preferably at a slightly more elevated temperature.

The compound trichlorovinylpentachlorocyclopentadiene may be converted by fluorination, as with antimony pentafluoride, to compounds of the formula $C_7ClF_{11}$ and $C_7Cl_2F_{10}$. These compounds may in turn be fluorinated with metallic perfluorides, i. e., silver difluoride, to a compound of the formula $C_7ClF_{13}$. These compounds are unsaturated and saturated derivatives of ethylcyclopentane, respectively.

The following examples are given to illustrate the practice of the present invention, but are in no way to be construed as limiting.

*Preparation 1. — 5 - (1,2,2,2 - tetrachloroethyl) - pentachloro-1,3-cyclopentadiene*

Approximately one-fifth of 263 grams of trichloroethylene ($C_2HCl_3$) was added to a stirred mixture of 546 grams of hexachlorocyclopentadiene ($C_5Cl_6$) and 40 grams of anhydrous aluminum chloride ($AlCl_3$) during a period of 15-20 minutes as the temperature was increased from 30 to 80 degrees centigrade. The exothermic heat of reaction was regulated by the rate of addition of the remaining four-fifths of trichloroethylene to maintain the temperature at about 80 degrees centigrade. The addition of all of the trichloroethylene required one hour, and the reaction mixture was maintained at 80 degrees centigrade for an additional one and one-half hours. When the reaction product was cooled and poured onto cracked ice, a solid, 5-(1,2,2,2 - tetrachloroethyl) - 1,2,3,4,5 - pentachloro-1,3-cyclopentadiene ($C_7HCl_9$) separated. Filtration and recrystallization from methyl alcohol gave 674 grams of the 5-(1,2,2,2-tetrachloroethyl)-1,2,3,4,5 - pentachloro - 1,3 - cyclopentadiene ($C_7HCl_9$), which had a melting point of 80.5 degrees centigrade and a chlorine content of 78.6 per cent, as compared to the theoretical chlorine content of 78.2 per cent. The conversion was 84.4 per cent, based on the starting hexachlorocyclopentadiene.

*Example.—Trichlorovinyl-1,3-pentachlorocyclopentadiene*

Trichloroethylene ($C_2HCl_3$; 2230 grams) was added slowly to an agitated mixture of 4,530 grams of hexachlorocyclopentadiene ($C_5Cl_6$) and 60 grams of anhydrous aluminum chloride ($AlCl_3$) over a period of 35 minutes while the temperature rose from 40 degrees centigrade to 80 degrees centigrade. External cooling was applied for one hour and fifteen minutes to maintain the temperature at about 80 degrees centigrade. External heat was applied for three hours once the exothermic heat of reaction failed to maintain the temperature at 80 degrees centigrade.

After addition of all the trichloroethylene, the reaction product, which consisted essentially of 5-(1,2,2,2 - tetrachloroethyl) - 1,2,3,4,5 - pentachloro-1,3-cyclopentadiene ($C_7HCl_9$), was heated at 102-104 degrees centigrade for 15 hours and then at 111-114 degrees centigrade for 8 hours. Hydrogen chloride was evolved continuously from the reaction mixture at temperatures above 80 degrees centigrade. The reaction mixture was cooled, poured onto ice, diluted with carbon tetrachloride, and washed with water. The dried product was then distilled from a Claisen flask at 6–8 millimeters of mercury, 5000 grams distilling from 110 to 175 degrees centigrade. Rectification of 2,925 grams of the distilled product gave 2,312 grams of trichlorovinyl-1,3-pentachlorocyclopentadiene ($C_7Cl_8$). This represents a 64.7 per cent conversion and 66.1 per cent yield. Trichlorovinyl - 1,3 - pentachlorocyclopentadiene is a pale yellow liquid having a boiling point of 138 degrees centigrade at 5 millimeters of mercury pressure absolute, a density ($D_4^{20}$) of 1.736, and a refractive index ($n_D^{20}$) of 1.585. The chlorine content on analysis was 77.6 per cent, compared to a theoretical value of 77.2 per cent. The compound decomposes at temperatures above 400 degrees centigrade to form lower molecular weight chlorinated olefins.

*Preparation 2.—Acetals of trichlorovinyltrichlorocyclopentadienone*

A solution of 280 grams of technical potassium hydroxide flakes in one liter of methanol was added to a solution of 100 grams of trichlorovinylpentachlorocyclopentadiene (Example) in 500 milliliters of methanol at such a rate that the temperature was maintained at 40 to 50 degrees centigrade. After dilution of the reaction mixture with water, the resulting liquid organic layer was washed with water and crystallized from heptane to give 60 grams of the dimethyl acetal of trichlorovinyltrichlorocyclopentadienone, a white solid melting at 39 degrees centigrade. This compound is readily converted to a red oil by traces of acid at room temperature.

In the same manner as that given above, the diethyl acetal of trichlorovinyltrichlorocyclopentadienone, a white solid, is prepared from ethanol and trichlorovinylpentachlorocyclopentadiene in an alkaline medium.

*Preparation 3.—Trichlorovinyltrichlorocyclopentadienone and the dimer thereof*

One hundred and thirty-two grams of the dimethyl acetal of trichlorovinyltrichlorocyclopentadienone (Preparation 2) was added to 300 milliliters of concentrated sulfuric acid at 0 to 5 degrees centigrade over a period of 40 minutes. The resulting blood-red solution was poured onto cracked ice, whereafter the red oil thus obtained was washed with water. The dimer of trichlorovinyltrichlorocyclopentadienone, a white solid, was separated from the homogenous red oil by the addition of 90 milliliters of ethyl alcohol. The crystals of the dimer were filtered and recrystallized from acetone to produce 3 grams of the pure dimer of trichlorovinyltrichlorocyclopentadienone, a white crystalline solid having a melting point of 207 degrees centigrade, which evolved carbon monoxide at temperatures above 240 degrees centigrade. The dimer has the probable formula:

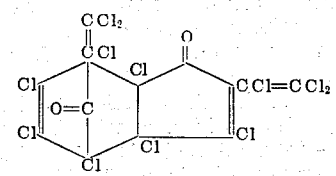

Anal. Calcd.: per cent Cl, 68.0; mol. wt., 626.
Found: per cent Cl, 68.0; mol. wt. (ebullioscopic in benzene), 633.

The red liquid monomer, which distilled at about 175–180 degrees centigrade at 5 millimeters of mercury pressure, was obtained by evaporation of the alcohol from the alcoholic filtrate. An additional quantity of the dimer was obtained by heating the monomer at 170 degrees centigrade for one-half hour, cooling the mixture, and precipitating by the addition of ethyl alcohol.

*Preparation 4.—Conversion of trichlorovinyl-5,5-dimethoxytrichlorocyclopentadiene to $C_7Cl_5O_2H$*

During a period of 5 minutes, 50 grams of trichlorovinyl - 5,5 - dimethoxy - trichlorocyclopentadiene (Preparation 2) was added to 300 grams of concentrated sulfuric acid at 30 to 45 degrees centigrade. The blood-red liquid, obtained by pouring the reaction mixture onto ice, was washed with water and recrystallized three times from petroleum ether (boiling range 35 to 37 degrees centigrade) to obtain 5 grams of a yellow compound, $C_7Cl_5O_2H$, which was found to contain 60.1 per cent chlorine (calculated, 60.2 per cent chlorine) and to melt at about 96 degrees centigrade. The product was shown to be identical to the compound $C_7Cl_5O_2H$ obtained by the action of sulfuric acid on trichlorovinylpentachlorocyclopentadiene (Example) by the method of mixed melting point determination.

*Preparation 5.—Hydrolysis of trichlorovinylpentachlorocyclopentadiene to the compound $C_7Cl_5O_2H$*

A mixture of 1000 grams of trichlorovinylpentachlorocyclopentadiene and 4000 grams of concentrated sulfuric acid was stirred vigorously for 7 hours at 120 to 125 degrees centigrade. The reaction mixture gradually became dark with the simultaneous conversion of the two-phase system to a one-phase system. The cooled reaction mixture was extracted five times with a total of 5 liters of carbon tetrachloride. Evaporation of the solvent and recrystallization of the resulting solid from carbon tetrachloride produced 315 grams of the yellow compound $C_7Cl_5O_2H$, having a melting point of about 96 degrees centigrade, and which was shown to be identical to the compound $C_7Cl_5O_2H$ obtained by the hydrolysis of trichlorovinyl - 5,5 - dimethoxytrichlorocyclopentadiene with concentrated sulfuric acid as determined by the method of mixed melting points.

*Preparation 6.—Preparation of $C_7ClF_{11}$, $C_7Cl_2F_{10}$, and $C_7ClF_{13}$*

A three-neck flask containing trichlorovinylpentachlorocyclopentadiene, $C_7Cl_8$ (440 grams, 1.19 moles), was equipped with a thermometer, stirrer, distillation arm, and dropping funnel containing antimony pentafluoride (2,650 grams, 12 moles). The distillation arm was connected to a condenser, receiver, a second condenser, and finally to an ice-water receiver. The chlorocarbon was heated to 130 degrees centigrade before the addition of antimony pentafluoride was begun. The temperature of the reaction was regulated at 120–135 degrees centigrade by the rate of addition of antimony pentafluoride. After about 1200 grams had been added, the reaction was no longer sufficiently exothermic to maintain a temperature of 120 degrees even upon rapid addition. Heat was therefore applied gradually so that a gentle distillation occurred. The final temperature was 170 degrees centigrade. Nearly all the product, a colorless liquid, collected in the first trap, was washed twice with concentrated hydrochloric acid, twice with water, and dried. The crude product weighed 268 grams, analyzed 14.0 per cent chlorine and 60.4 fluorine, and was rectified in a 52-inch column packed with small glass helices over a period of 34.5 hours. The rectification curve revealed two clear-cut fractions. The first fraction (B. P. 90–92° C.; 153.5 g.; $D_4^{20}$ 1.7009; $n_D^{20}$ 1.3210; 10.9, 10.7% Cl; 63.8, 62.7% F; 328, 330 M. W.) was $C_7ClF_{11}$, which contains 10.7% Cl, 63.7% F, and has a molecular weight of 328. The second fraction (B. P. 116° C.; 62.5 g.; $D_4^{20}$ 1.7174; $n_D^{20}$ 1.3482; 21.0, 21.8% Cl; 55.6, 55.7% F; 349, 346 M. W.) was $C_7Cl_2F_{10}$, which contains 20.6% Cl, 55.1% F, and has a molecular weight of 345. Both fractions decolorized permanganate and reacted violently with alcoholic base. The compound $C_7Cl_2F_{10}$ appears to form a solid product with alcoholic base. The products, $C_7ClF_{11}$ and $C_7Cl_2F_{10}$, are unsaturated derivatives of ethylcyclopentane.

The compound, $C_7ClF_{11}$, (118 grams, 0.36 mole) was vaporized and passed over silver difluoride (20 moles) during a period of 2.5 hours at 295–300 degrees centigrade. At the conclusion of the addition, the reactor was swept out with nitrogen for 3 hours. The product was collected in an ice-water trap followed by a Dry-Ice trap. The first trap contained 106 grams and the second trap 5–10 grams of organic material. The crude product was washed twice with water and dried prior to rectification. Rectification gave only one fraction (B. P. 102° C.; 67 g., $D_4^{20}$ 1.7999; $n_D^{20}$ 1.3073; 9.8, 10.2% Cl; 67.8, 68.3% F; 369, 370 M. W.). This material corresponds to the formula $C_7ClF_{13}$, which contains 9.6% Cl, 67.5% F, and has a molecular weight of 366.

Reference is made to our copending application Serial 52,404, filed October 1, 1948, which is directed to the conversion of hexachlorocyclopentadiene to 5-(1,2,2,2-tetrachloroethyl)-1,2,3,4,5-pentachloro-1,3-cyclopentadiene and to our copending applications Serials 52,407, now abandoned, and 52,410, both filed October 1, 1948, in which the chloroketone $C_7Cl_5O_2H$ disclosed herein and processes for its production are claimed.

Various modifications may be made in the invention without departing from the spirit or scope thereof, and it is to be understood that we limit ourselves only as defined in the appended claims.

We claim:

1. A process for the production of trichlorovinylpentachlorocyclopentadiene which comprises heating 5-(1,2,2,2-tetrachloroethyl) pentachlorocyclopentadiene at a temperature between approximately 90 and approximately 180 degrees centigrade in the presence of aluminum chloride and subsequently recovering trichlorovinylpentachlorocyclopentadiene from the reaction mixture.

2. A process as defined in claim 1 in which the temperature is between approximately 100 and approximately 130 degrees centigrade.

3. A process for the production of trichlorovinylpentachlorocyclopentadiene which comprises the condensation of trichloroethylene with hexachlorocyclopentadiene in the presence of aluminum chloride to form 5-(1,2,2,2-tetrachloroethyl) - 1,2,3,4,5-pentachloro - 1,3-cyclopentadiene and subsequently heating the reaction mixture at a temperature between approximately 100 and approximately 130 degrees centigrade and subsequently recovering trichlorovinylpentachlorocyclopentadiene from the reaction mixture.

4. Trichlorovinylpentachlorocyclopentadiene, which is a normally liquid substance having the empirical formula $C_7Cl_8$, a boiling point of approximately 138 degrees centigrade at a pressure of 5 millimeters of mercury, a density ($D_4^{20}$) of approximately 1.736 and a refractive index ($n_D^{20}$) of approximately 1.585.

EARL T. McBEE.
JACK S. NEWCOMER.

REFERENCES CITED

The following references are of record in the file of this patent:

UNITED STATES PATENTS

| Number | Name | Date |
|---|---|---|
| 1,891,043 | Diels et al. | Dec. 13, 1932 |
| 2,013,752 | Gans et al. | Sept. 10, 1935 |
| 2,146,720 | Christiansen | Feb. 14, 1939 |
| 2,336,208 | Alder et al. | Dec. 7, 1943 |
| 2,467,123 | Fleck et al. | Apr. 12, 1949 |

OTHER REFERENCES

Prins, "Rec. des Trav. Chim. des Pays-Bas," vol. 65, pages 455–67 (1946).

Krynitsky Ph. D. Thesis, University of North Carolina, pages 27–9 (1943).